United States Patent
Surazski et al.

(10) Patent No.: US 6,775,697 B1
(45) Date of Patent: Aug. 10, 2004

(54) LOCALLY CONFIGURABLE AUDIO IP NETWORK APPLIANCE AND METHOD FOR CONFIGURING THE SAME

(75) Inventors: Luke K. Surazski, San Jose, CA (US); Michael Edmund Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/579,722

(22) Filed: May 26, 2000

(51) Int. Cl.[7] .............................................. G06F 13/00
(52) U.S. Cl. ...................... 709/220; 709/221; 345/705; 345/709
(58) Field of Search ................................ 709/220, 221, 709/222; 434/350; 345/705, 709

(56) References Cited

U.S. PATENT DOCUMENTS

| | | | |
|---|---|---|---|
| 5,727,950 A | * | 3/1998 | Cook et al. ................. 434/350 |
| 6,009,398 A | * | 12/1999 | Mueller et al. ............. 704/275 |
| 6,157,705 A | * | 12/2000 | Perrone .................... 379/88.01 |
| 6,182,134 B1 | * | 1/2001 | Collins et al. .............. 709/224 |
| 6,377,570 B1 | * | 4/2002 | Vaziri et al. ................ 370/352 |
| 6,577,881 B1 | * | 6/2003 | Ehara ......................... 455/563 |

* cited by examiner

Primary Examiner—Kenneth R. Coulter
(74) Attorney, Agent, or Firm—Marger Johnson & McCollom, PC

(57) ABSTRACT

A locally configurable audio IP network appliance provides audio feedback to the installer while in a configuration mode. The appliance includes a normal audio output module, that generates a signal for the speaker driver, which in turn drives a speaker. The appliance also includes a switch that permits, during configuration, its maintenance module to be coupled to the speaker driver instead of the normal audio output module. The maintenance module includes prompts that generate suitable utterances when applied to the speaker. The installer listens to the utterances, while interactively pushing the buttons of a numeric keypad such as a DTMF keypad. A method is for the appliance to present the installer with an option to change the settings of configuration parameters. Presentation is made by announcement through the speaker. The appliance then waits for inputs, such as the keystrokes. When valid inputs are received, then the appliance implements the inputted settings.

31 Claims, 6 Drawing Sheets

| Prompt Name | Text of Verbal Prompt |
|---|---|
| N0, N1, ..., N9 | "zero", "one", ..., "nine" |
| Dot | "dot" |
| Greeting | "Welcome to the <demo Configuration> system." |
| ActiveCalls | "There appear to be other calls active on the system. Configuration cannot continue. Goodbye" |
| MainMenu | "Main Menu. To listen to the current configuration press one. To change the current configuration press two. To exit press the pound sign." |
| IPUnicastAddressIs | "The current IP unicast address is" |
| IPNetmaskIs | "The current IP netmask is" |
| EnterIPUnicastAddress | "Please enter a twelve digit IP unicast address" |
| EnterIPNetmask | "Please enter a twelve digit IP netmask" |
| Invalid | "I'm sorry, that is not a valid response." |
| Timeout | "I'm sorry, I did not get a response." |
| YouEntered | "You entered" |
| ChangeMenu | "To accept this entry press one. To change this entry press two." |
| ConfigMenu | "To save this configuration press one. To revert to the old configuration press two." |
| YouAreTrouble | "Sorry you are having trouble, please refer to page  for assistance. Goodbye." |
| Goodbye | "I'll miss you" |

FIG. 7

LOCALLY CONFIGURABLE AUDIO IP NETWORK APPLIANCE AND METHOD FOR CONFIGURING THE SAME

BACKGROUND OF THE INVENTION

1. Field of the Invention

The present invention is related to the field of IP network appliances, and more specifically to IP network appliances that do not have a display and can be configured locally.

2. Description of the Related Art

Every Internet Protocol (IP) network appliance needs to be configured for its specific intended operation. Configuring means applying values for the various settings. As an example of settings, the appliances must have their network addresses set, so that their specific location within the network is recognized. Sometimes it is also necessary to set manually and/or reconfigure these network parameters after initialization. Other times it is desirable to even retrieve these parameters, after they have been set.

It is advantageous to perform configuring interactively. This means that, when the installer supplies values for settings, he receives feedback immediately as to what is accomplished. This way he can correct any errors on the spot, until configuration is complete.

Interactive configuring has been performed using a display. The installer receives visual feedback for what he does. Interactive configuring works well with IP network appliances that include a display.

Not all IP network appliances have a display, however, because they do not need it for normal operation. Such appliances include traditional analog telephones connected to a residential gateway. Worse, many network endpoints themselves have no inherent display capability. This leaves out IP network appliances intended for audio telecommunications. Adding a display to these devices only for a one time configuration process is not economically justified. Accordingly, some of their settings must be configured remotely, as is described below.

Referring to FIG. 1, an audio IP network appliance 102 is connected to an IP network 104 through an IP gateway 106. Since the audio IP network appliance 102 does not include a display, it must be configured remotely. This is accomplished by using also a remote management station 108, which includes a display.

The process of FIG. 1 for configuring audio IP network appliance 102 may be impossible without configuration of basic IP parameters. In any event, the configuration process is cumbersome. The process requires a physical connection at one location, and a remote configuration from another physical location. If there is an error in either one, more than one session may be required. Alternately, it requires two installers, one in each location, operating simultaneously. They are in communication with each other and provide live feedback to each other.

It is desired to simplify the configuration process for IP network appliances that do not include a display.

BRIEF SUMMARY OF THE INVENTION

The present invention overcomes these problems and limitations of the prior art.

Generally, the present invention provides a locally configurable audio IP network appliance. The device is locally configurable, because it provides audio feedback to the installer. The invention also provides a method for configuring an audio IP network appliance interactively. The method supplies the installer with an interactive voice response system, responding to his actions.

The appliance includes a normal audio output module, that generates a signal for the speaker driver, which in turn drives a speaker. The appliance also includes a switch that permits, during configuration, its maintenance module to be coupled to the speaker driver instead of the normal audio output module. The maintenance module includes prompts that generate suitable utterances, when applied to the speaker. These utterances describe present settings and options. The installer listens to the utterances, while interactively pushing the buttons of a numeric keypad.

A method according to the invention is for the appliance to present the installer with an option to change the settings of configuration parameters. Presentation is made by announcement through the speaker. The appliance then waits for inputs, such as the keystrokes. When valid inputs are received, then the appliance implements the inputted settings.

The invention offers the advantage that these IP network audio appliances can be configured locally, even though they do not have a display. A single installer can install and configure one in one session interactively, without needing to access the remote management station.

The invention will become more readily apparent from the following Detailed Description, which proceeds with reference to the drawings, in which:

BRIEF DESCRIPTION OF THE DRAWINGS

FIG. 7 is a table of a library of prompts suitable for use with the present invention.

DETAILED DESCRIPTION OF THE PREFERRED EMBODIMENT(S)

As has been mentioned, the present invention provides a locally configurable audio IP network appliance. The device is locally configurable, because it provides audio feedback to the installer. The appliance of the invention is now described in more detail.

Figure 1:
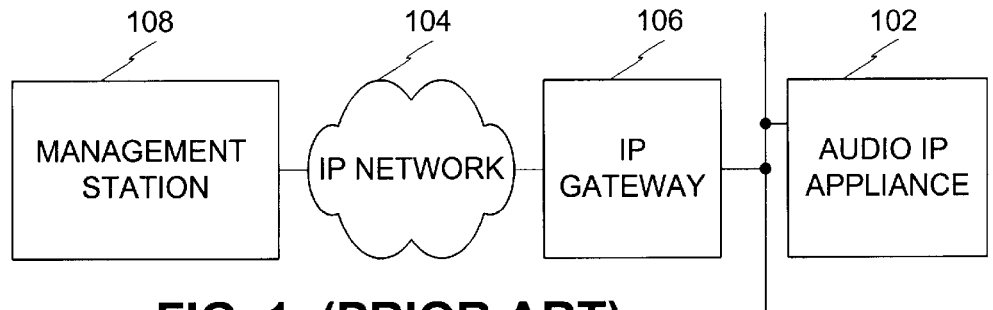
FIG. 1 is a diagram showing a prior arrangement for configuring a network appliance lacking a display.
Figure 2:
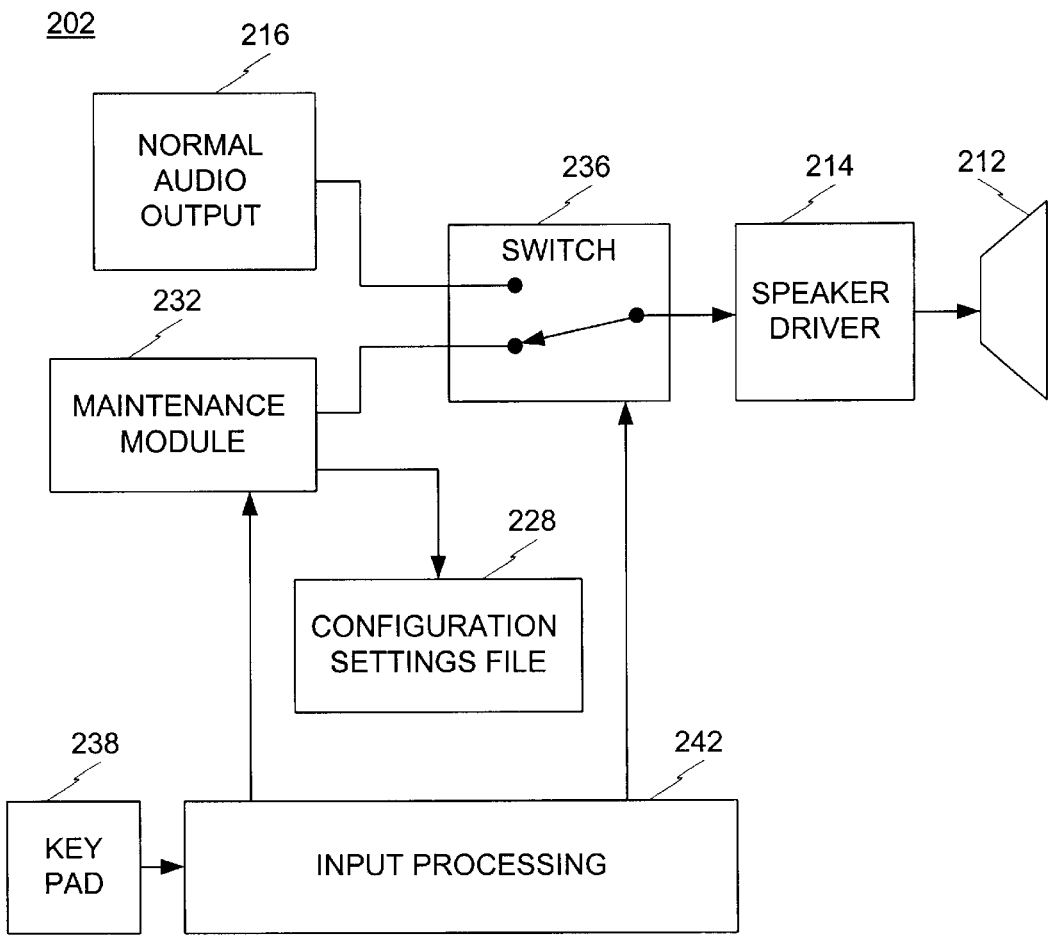
FIG. 2 is a partial block diagram of a locally configurable IP network appliance made according to the present invention.

Referring now to FIG. 2, an appliance 202 made according to the invention is described. The appliance is for installing at the specific location in an IP network. Appliance 202 can be an IP telephone, a residential IP voice gateway, an IP radio, etc.

Appliance 202 includes a speaker 212, and a driver 214. The driver 214 is for driving the speaker 212, in response to an audio signal supplied to the driver 214. A typical driver 214 can be a buffer amplifier, which simply amplifies the audio signal. This is why it can be said that the audio signal is applied to the speaker 212.

Appliance 202 includes a normal audio output module 216. Module 216 is for supplying a normal audio signal to the driver 214 during a normal operating mode. In other words, module 216 is what normally controls the speaker 212 in the normal operation of the device 202. It should be remembered that appliance 202 is preferably an audio appliance. Accordingly, speaker 212, driver 214, and module 216 are already provided normally, and no retrofitting is required for the present invention as to these elements.

Since appliance 202 is for configuring in an IP network, it also includes a plurality of settings to define its eventual specific location in the network. The settings can be by switches, manual or in software, such as in a configuration settings file 228. Appliance 202 also includes a maintenance module 232 for controlling the settings while the appliance 202 is in a configuration mode.

It is understood that module 216 and module 232 can be either separate physical devices, or separate software modules, implemented in a single or multiple programs. Module 216 controls while in the normal mode. The installer can make the appliance 202 revert to the configuration mode, where the maintenance module 232 controls.

According to the invention, maintenance module 232 can additionally control the speaker 212. Since the speaker 212 is local, the installer (not shown) can hear it, and adjust his actions during the maintenance mode. His live feedback comes through the speaker 212, originating from the maintenance module 232.

The invention accomplishes this by having the maintenance module 232 supply a configuration audio signal to the speaker 212. The configuration audio signal is characteristic of the configuration mode.

The configuration audio signal generates preset verbal prompts, when applied to the speaker 212. These include announcements, such as the names of the settings. The configuration audio signal also generates verbal utterances, when applied to the speaker 212. The utterances are characteristic of current settings. For example, a verbal prompt can be "the current IP unicast address is", and a following verbal utterance can be "123 dot 234 dot 12 dot 45".

Appliance 202 also includes a switch module 236 that supplies to the driver 214 the configuration audio signal. The configuration audio signal is supplied to the driver 214, instead of the normal audio signal while in the configuration mode. The switch 236 can be either a physical switch, or one implemented in software.

Appliance 202 need not have a DTMF keypad, or other ways of making numeric entries. If it does not, it can still receive and interpret inputs, for revealing the current state of its settings. The inputs are preferably generated locally, such as from a keyboard. If the appliance does not have a numeric entry device, it can be connected with the device that does, through a non-IP connection, and which does not needs to be configured (such as a residential IP voice gateway that has an analog telephone connected to it). Connection can be through an analog or digital voice port.

Alternately, appliance 202 can further include a keypad 238 for generating electrical signals corresponding to numbers or letters, which are also known as numeric signals. These signals can be Dual Tone Multi Frequency (DTMF) pulse digits, but that is not necessary. For example, an IP telephone already includes a keypad 238. In that case, appliance 202 also includes an input processing module 242, for receiving and decoding the numeric signals generated by the keypad 238.

Module 242 controls the transition between the normal operating mode and the configuration mode. This is depicted by an arrow from module 242 to switch 236. Alternately, module 242 controls the maintenance module 232, as shown by another arrow. A person skilled in the art will discern that if module 216, module 232, and switch 236 are implemented in software, there is only one arrow from module 242 to the software, and so on. Additionally, if module 232 controls the switch 236, then only one arrow to the maintenance module 232 need be shown.

The maintenance module 232 interprets the keypad entries as commands for updated settings. In addition, the maintenance module 232 installs the updated settings during the configuration mode, as interpreted from the commands.

The appliance of the invention has at least two parameters configured, for functioning as part of a network. These are the IP address of the appliance, and the subnet mask of the subnet (network segment), on which the appliance resides. With these two parameters configured, the appliance of invention can communicate with other IP devices on the same subnet. To communicate with an IP device on a different subnet, the appliance of the invention would also need to be configured with the IP address of the router that is on its subnet and which either directly or indirectly (through other routers) connects to the subnet of the other IP device.

The invention also provides methods for configuring an audio IP network appliance interactively, by supplying the installer with audio feedback. In its most general embodiment, the method is for an appliance 202 to give verbal feedback about one of its configuration parameters.

The method includes decoding an inquiry about a setting of the configuration parameter. The inquiry can come in a number of ways, such as from running a preset automated menu. Alternately, it can be from signals generated by a keyboard from the installer.

The preferred way for generating an inquiry is for the installer to use a keypad for generating numeric signals, and then interpreting the numeric signals to decode the inquiry. Even if the appliance 202 does not have a keypad, an inquiry can be generated by connecting a local telephone handset.

The appliance 202 then determines the setting of the inquiry for the parameter, and generates electrical signal responsive to the setting. The appliance 202 then applies the generated electrical signal to a speaker of the appliance, to generate a corresponding sound signal. The sound signal is an utterance that is heard by the installer, and is the answer to the inquiry.

When the installer controls the menu, the appliance 202 additionally looks up in a library a prompt that corresponds to the inquiry for the parameter. The appliance 202 then applies the looked up prompt to the speaker 212 to generate an announcing sound signal. Examples of such prompts are given in FIG. 7.

Figure 3:
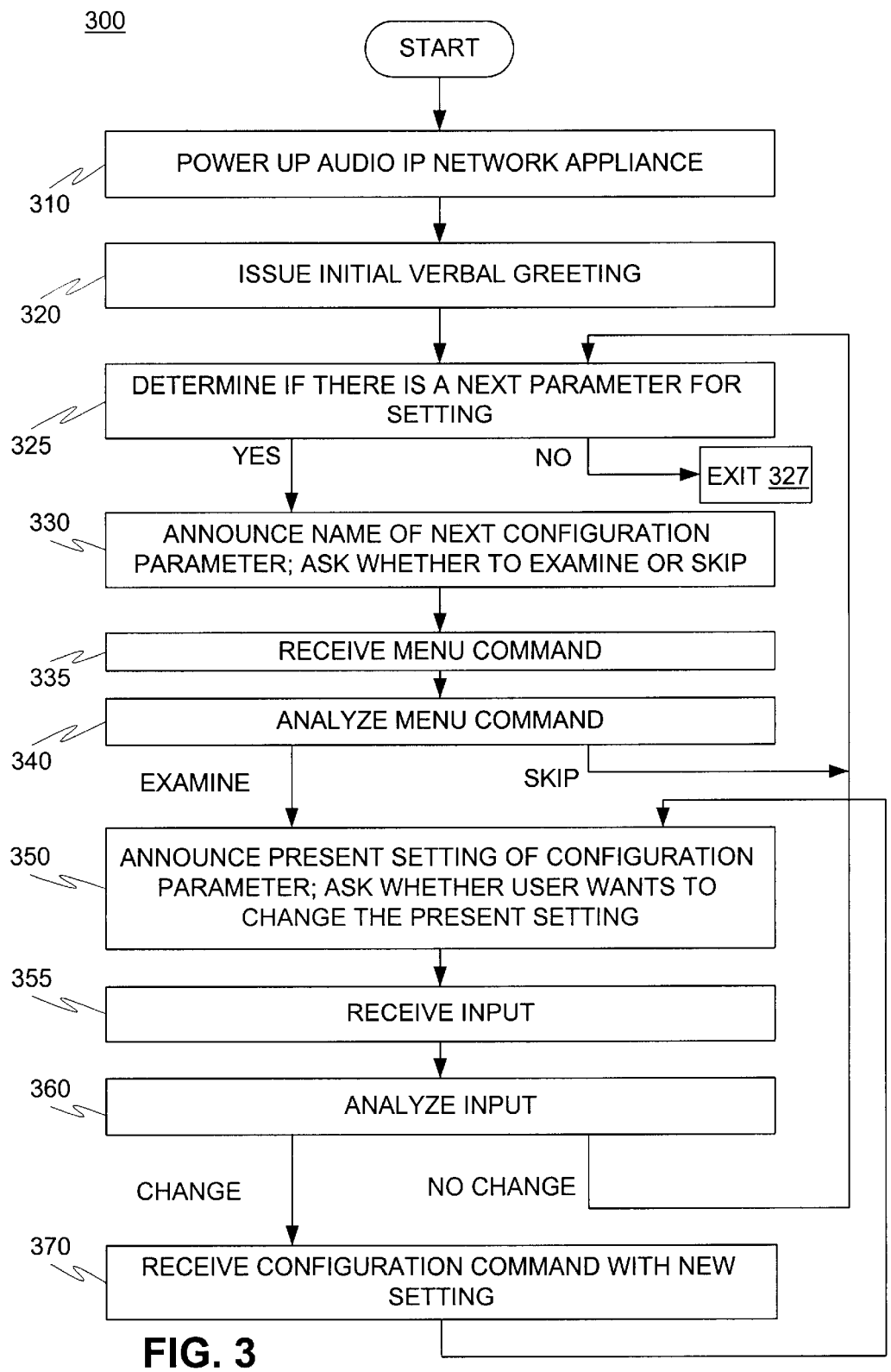
FIG. 3 is a flowchart for illustrating a first configuring method performed by an appliance according to the invention, wherein all the available parameters are stepped through for setting.

Referring now to FIG. 3, a method is described for configuring an audio IP network appliance according to the invention.

According to box 310, an audio IP network appliance is powered up, after being coupled for the first time to the network. This places it in a configuration mode. If not, the appliance is then placed in its configuration mode.

According to box 320, an initial verbal greeting is issued, intended for the installer. The verbal greeting is issued in by generating an initial electrical signal. The initial electrical signal is supplied to a speaker of the appliance, for generating an associated sound signal that corresponds to the verbal greeting.

According to box 325, it is determined if there is the next parameter for setting. If not, the subroutine exits, as per box 327.

If yes, the appliance announces the name of the next configuration parameter. Then it asks whether to examine it, or skip it. Announcing the name is by generating a menu electrical signal, and by applying the menu electrical signal to the speaker. This generates an associated sound signal that corresponds to a menu. The menu here is construed generally. In the embodiment of FIG. 3, the menu is to ask for all parameters sequentially. Other menus, also known as scripts, can be implemented.

According to a next box 335, a menu command is received. According to a next box 340, the menu command is analyzed. If it is a request to skip setting the next configuration parameter, execution returns to box 325. Otherwise, the installer will at least examine the present value of the setting of the next configuration parameter.

According to a box 350, the appliance announces the present setting of the configuration parameter. The appliance then asks whether the user wants to change the present setting. This can be performed in a simple manner, such as by saying "press 1 for yes and 2 for no".

According to box 355, input is received, and according to box 360 the received input is analyzed. If the user does not want to change the present setting, execution returns to box 325. Otherwise, the user will enter the new value of the setting.

According to box 370, the appliance receives the configuration command, which includes the new setting value. If the command and the value are proper, then the new value is set. Then execution returns to box 350. The present setting, however, is the new setting.

Figure 4:
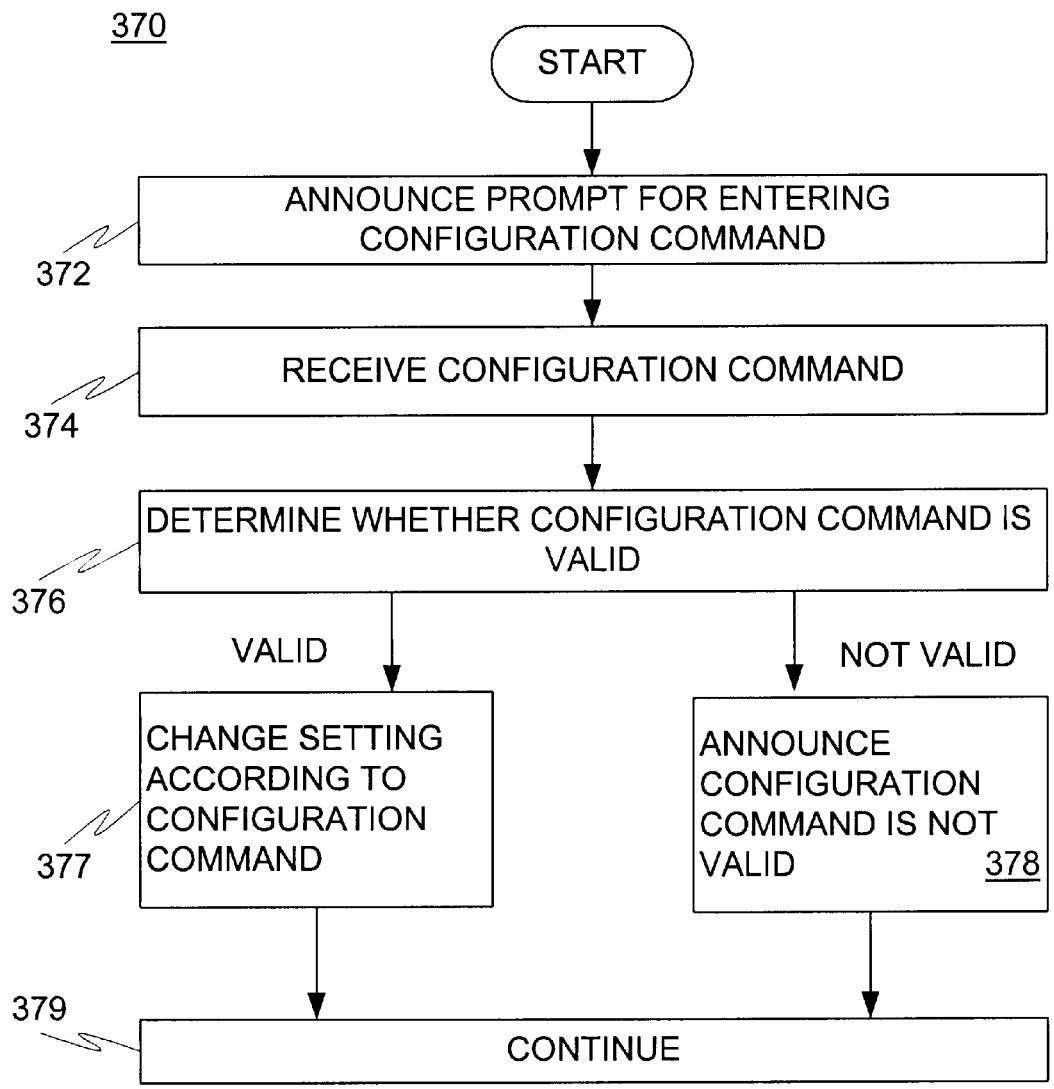
FIG. 4 is a flowchart for illustrating an embodiment for a box 370 of FIG. 3.

Referring now to FIG. 4, the box 370 is analyzed in more detail.

According to box 372, the appliance announces a prompt for entering the configuration command. The prompt can be the words "enter the new value now".

According to a next box 374, a configuration command is received, which can be called a first configuration command. Then according to a next box 376, the first configuration command is decoded. Decoding is for determining whether the first configuration command carries a valid new value. Preferably a keypad is used for generating DTMF signals, which are received and in turn interpreted to decode the first configuration command.

According to a next box 377, if the value is valid, the setting is changed according to the first configuration command. This configures the appliance differently. Alternately, if the value is not valid, according to a box 378, it is announced that the configuration command is not valid. In this case, no setting is changed as a result.

According to a next box 379, the process continues. Referring back to FIG. 3, the next box 379 is box 350. There, the appliance can be construed to generate a first electrical signal responsive to the first configuration command. Then the appliance applies the first electrical signal to speaker 212, to generate a first sound signal. The first sound signal can be the present setting of the configuration parameter.

The appliance can also carry a timeout feature. After applying the first electrical signal to the speaker, the appliance can wait to receive an input for a preset period of time. If no input has been received after the preset period of time, the appliance generates a second electrical signal. The second electrical signal is applied to the speaker, to generate a message such as a help message.

Figure 5:
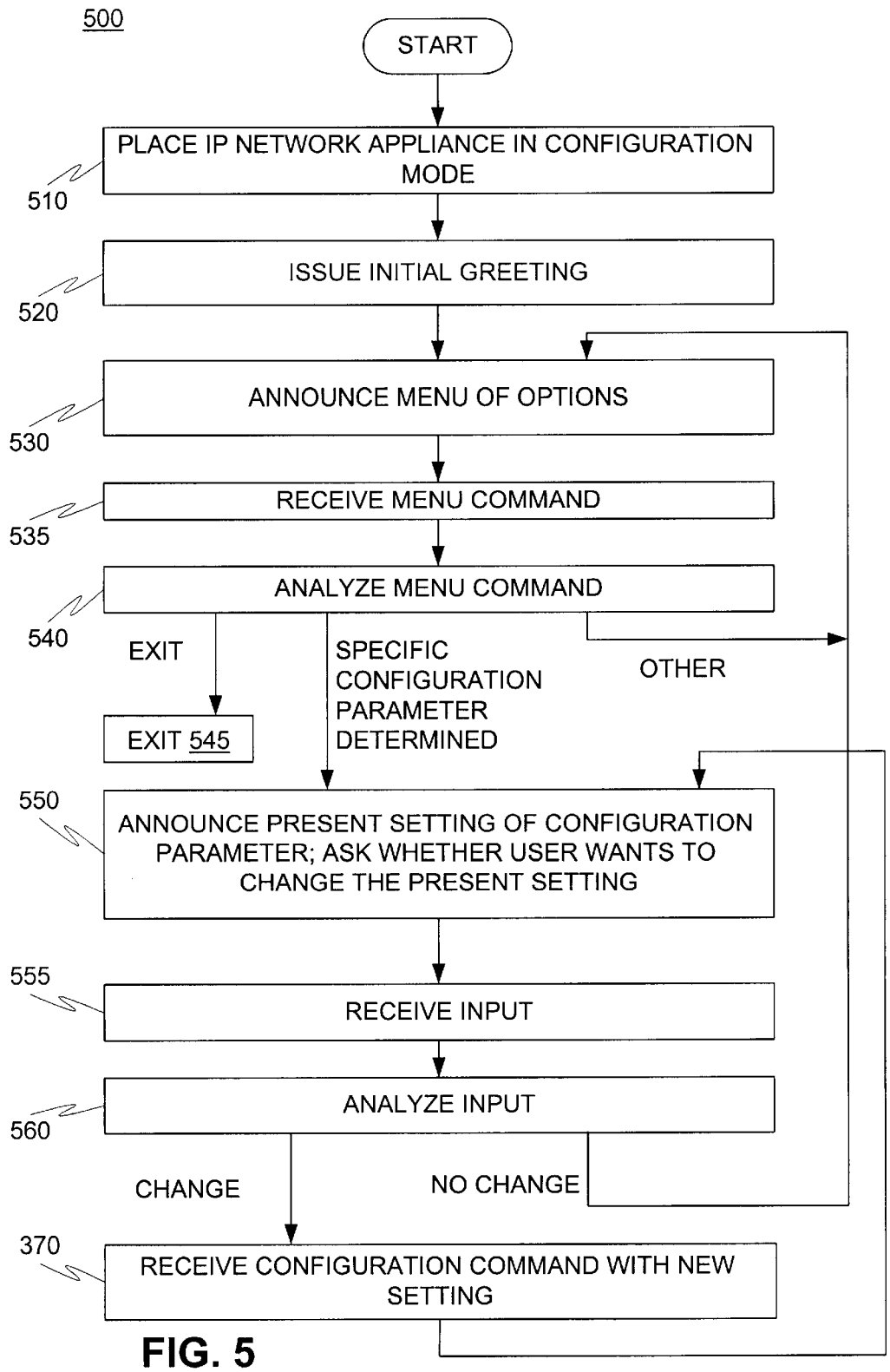
FIG. 5 is a flowchart for illustrating a second configuring method performed by an appliance according to the invention, wherein only some of the available parameters are selected for setting.

Referring now to FIG. 5, a flowchart 500 is used for describing a different method according to the invention. The flowchart 500 is especially useful for an installed appliance.

It will be appreciated that many of the boxes of flowchart 500 are similar to those of flowchart 300. It will be additionally appreciated that other, equivalent methods can be made by combining these boxes, or rearranging their order, or changing them slightly.

According to a box 510, the IP network appliance is placed in a configuration mode. If the appliance includes a keypad, this can be accomplished by entering a preset code. A useful such code is "****".

According to a box 520, an initial greeting is issued, similarly to box 320.

According to a box 530, a menu of options is announced. The menu can be to enter specific number, for examining and possibly changing the setting of a specific parameter.

According to a next box 535, a menu command is received, similarly to box 335.

According to a next box 540, the menu command is analyzed, similarly to box 540. If the menu command is to exit, then the script exits as per box 545. If the analyzed menu command does not determine a valid, specific configuration parameter to be changed, then execution returns to box 530. Otherwise, a specific configuration parameter is examined and possibly changed as follows.

According to box 550, and similarly to box 350, the appliance announces the present setting value of the configuration parameter. Additionally it asks whether the user wants to change the present setting.

According to box 555, the appliance receives the input, similary to box 355.

According to box 560, the appliance analyzes the input, similarly to box 360. If no changes are to be made, execution returns to box 550. Otherwise, execution continues with box 370, which was analyzed in detail in FIG. 4.

Figure 6:
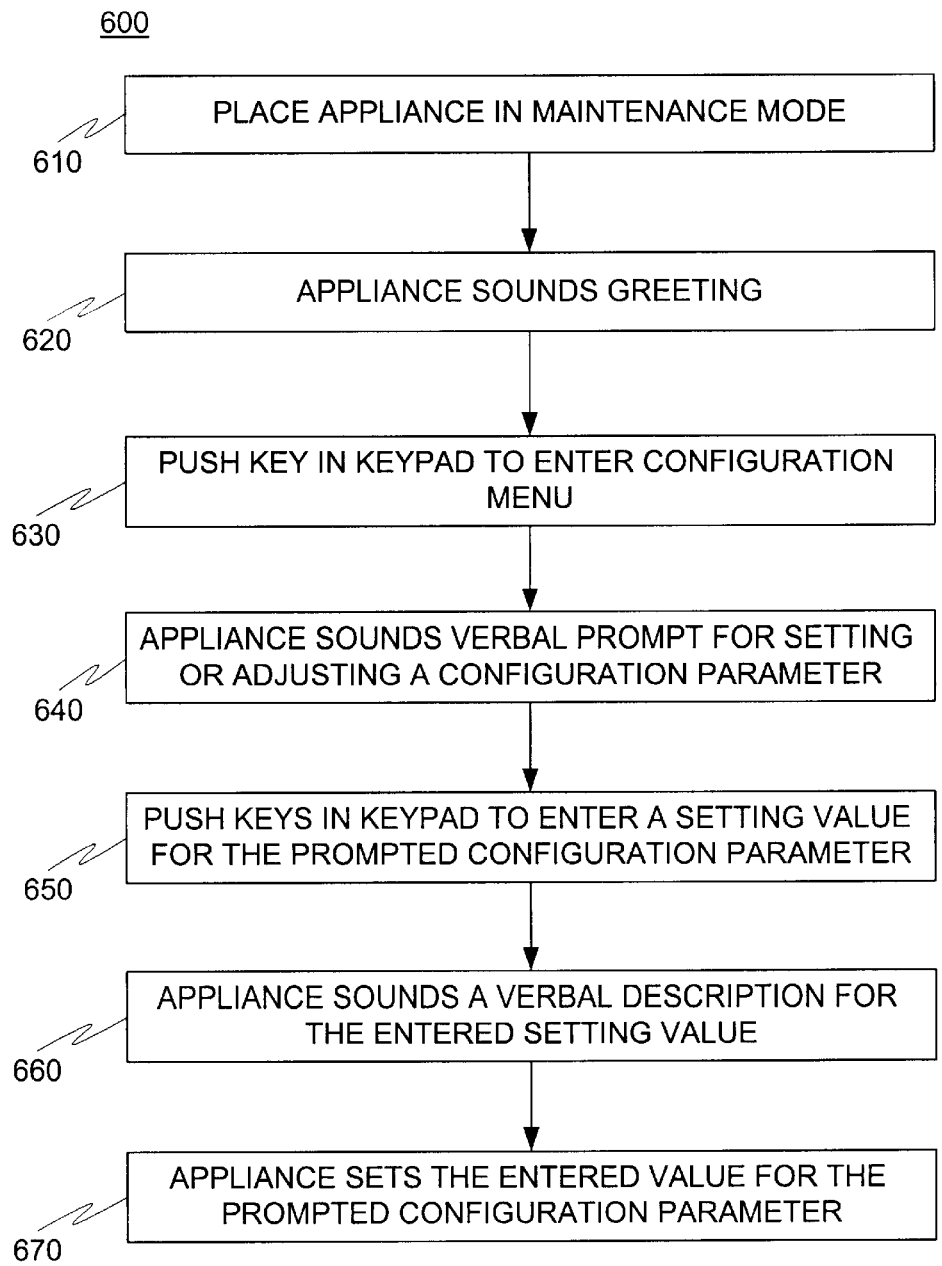
FIG. 6 is a flowchart for illustrating a method performed by an installer for configuring an appliance according to the invention.

Referring now to FIG. 6, a method is described using flowchart 600. The flowchart 600 is for a user, a.k.a. installer or operator, to set an appliance having a keypad in the speaker.

According to a box 610, the appliance is placed in maintenance mode. According to a box 620, the appliance sounds a greeting through the speaker. According to a box 630, the operator pushes the correct key or keys in the keypad, to enter a configuration menu.

According to a box 640, the appliance sounds a verbal prompt for setting or adjusting a specific configuration parameter.

Referring briefly to FIG. 7, examples of verbal prompts are given. Their names are given on the left, as variables for constructing the script.

Returning to FIG. 6, according to a box 650, the operator enters in the keypad a setting value for the prompted configuration parameter. Since the basic network parameters are all numeric in format, the prompt can be constructed out of a small set of key words. Indeed, the basic network parameters are four octets, each with a value between 0 and 255, separated by dots. This is significant, as the memory space needed to store the prompts is small, and thus does not impose a great requirement on the memory, and thus also on the cost of the appliance.

According to a box 660, the speaker sounds a verbal description of a setting value for the configuration parameter. That can be an utterance, which serves the user as a confirmation of what was entered.

According to a next box 670, the appliance sets the entered value for the prompted configuration parameter. This is preferably conditional on the entered value being valid for the parameter.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and nonobvious. Additional claims for other combinations and subcombinations of features, functions, elements and/or properties may be presented in this or a related document.

The invention claimed is:

1. A method for configuring an internet protocol (IP) network appliance, comprising:
   the appliance decoding a first configuration command corresponding to an IP address associated with or accessed by the IP network appliance;
   the appliance generating a first electrical signal responsive to the first configuration command;
   the appliance applying the first electrical signal to a speaker located in the appliance to generate a first sound signal audibly identifying the IP address; and
   the appliance automatically switching to outputting verbal human recognizable audio signals from the speaker generated from a remote phone endpoint or automatically switching to outputting music from the speaker generated by a music player when the first configuration command is completed.

2. The method of claim 1, wherein the IP appliance is an IP phone or IP music device.

3. The method of claim 1, further comprising:
   using a keypad in the IP phone or IP music device for generating numeric signals; and
   interpreting the numeric signals to decode the first configuration command.

4. The method of claim 1, further comprising:
   operating the IP network appliance in configuration mode for configuring the IP network appliance;
   generating the first electrical signal corresponding to the IP address during the configuration mode;
   operating the IP network appliance in a normal operating mode for presenting normal audio sounds to a user;
   generating a second electrical signal corresponding to the normal audio sounds during the normal operating mode;
   switching the first electrical signal to the speaker during the configuration mode and switching the second electrical signal to the speaker during the normal operating mode.

5. The method of claim 1, further comprising:
   generating an initial electrical signal; and
   applying the initial electrical signal to the speaker to generate an associated sound signal corresponding to a greeting.

6. The method of claim 1, further comprising:
   generating a menu electrical signal audibly presenting options for identifying, setting or modifying the IP address; and
   applying the menu electrical signal to the speaker to generate an associated sound signal corresponding to a menu.

7. The method for configuring an internet protocol (IP) network appliance, comprising:
   decoding a first configuration command;
   the appliance generating a first electrical signal responsive to the first configuration command;
   the appliance applying the first electrical signal to a speaker of the appliance to generate a first sound signal;
   after applying the first electrical signal to the speaker, waiting to receive an input for a preset period of time;
   if no input has been received after the present period of time, generating a second electrical signal; and
   applying the second electrical signal to the speaker.

8. An appliance for installing at a specific location in an internet protocol (TP) network comprising:
   a speaker located in the appliance;
   a driver located in the appliance for driving the speaker in response to a supplied audio signal;
   a normal audio output module located in the appliance supplying a normal verbal audio signal to the driver for human reception and interpretation during a normal operating mode;
   a maintenance module located in the appliance and configured to access a plurality of settings that define a specific location of the appliance in the IP network and further configured to control the settings in a configuration mode, the maintenance module a further configured to internally generate a verbal configuration audio signal for human reception and interpretation associated with the settings in the configuration mode; and
   a switch located in the appliance for supplying to the driver the verbal configuration audio signal instead of the normal verbal audio signal while in the configuration mode.

9. The appliance of claim 8, wherein
   the configuration audio signal generates present verbal prompts, when applied to the speaker.

10. The appliance of claim 8, wherein
    the configuration audio signal generates verbal utterances characteristic of current settings, when applied to the speaker.

11. The appliance of claim 8, further comprising:
    a keypad for generating numeric signals; and
    an input processing module for receiving the numeric signals to control a transition between the normal operating mode and the configuration mode.

12. The appliance of claim 8, further comprising:
a keypad for generating numeric signals;
an input processing module for receiving the numeric signals to control the maintenance module.

13. The appliance of claim 1 wherein the maintenance module outputs a first electrical signal to the speaker in the appliance associated with a first verbal prompt and generates a second electrical signal to the speaker in the appliance associated with a second verbal prompt when no input is received within a preset period of time after generating the first electrical signal.

14. A method for configuring an Internet Protocol (IP) appliance, comprising:
powering up the IP appliance;
automatically operating the IP application in a configuration mode after the IP appliance is powered up, the IP appliance in the configuration mode providing a verbal prompt directly from within the IP appliance audibly querying a user to identify, set or adjust a configuration parameter for the IP appliance;
receiving a request to identify, set or adjust the configuration parameter responsive to the verbal prompt;
identifying, setting or adjusting the configuration parameter according to the received request;
generating an electrical signal corresponding to the identity, setting or adjustment of the configuration parameter;
applying the electrical signal to a speaker of the appliance to audibly identify or verify the identity, setting or adjustment of the configuration parameter; and
automatically switching the IP appliance from the configuration mode to a normal audio output mode where music from an internal music source or human recognizable voice signals received from a user at an opposite telephone endpoint are output from the speaker when the received request indicates no additional identifying, setting or adjustment of the configuration parameter is required.

15. The method of claim 14, further comprising:
looking up in a library a prompt; and
applying the library prompt to the speaker to generate the verbal prompt.

16. The method of claim 14, further comprising:
receiving Dual Tone Multi-Frequency (DTMF) signals from a phone keypad containing the request responsive to the verbal prompt; and
identifying, setting or adjusting the configuration parameter according to the DTMF signals.

17. The method of claim 14, further comprising:
operating the appliance in a normal operating mode for generating normal audio signals;
operating the appliance in a configuration mode for configuring the appliance;
generating configuration signals during the configuration mode corresponding to the configuration parameter; and
controlling switching to the speaker for supplying the speaker with the normal audio signals during the normal operating in mode and supplying the speaker with the configuration signals during the configuration mode.

18. The method of claim 14, further comprising using the configuration parameter to identify, set, or adjust an IP address configured in a Voice Over IP (VoIP) phone or IP radio.

19. A method for configuring an appliance coupled to an internet protocol (IP) network, the method comprising:
operating the appliance in a first mode for conducting primary audio output operations;
receiving conventional audio signals consisting of verbal audio sounds from an external phone endpoint from a speaker in the appliance and operating a keypad in a conventional operating mode in the appliance when the appliance operates in the first mode;
operating the appliance in a second mode for configuring IP parameters in the appliance;
receiving a verbal prompt stored and generated internally from the appliance and output from the speaker identifying or querying for the IP parameters when the appliance is operating in the second mode;
using the keypad for entering a setting value identifying or varying the IP parameters in the appliance responsive to the verbal prompt when the appliance is operating in the second mode; and
receiving an audible signal back from the speaker verifying the setting value has been entered when the appliance is operating in the second mode.

20. The method of claim 19, wherein the appliance is an IP phone or IP music device.

21. An Internet Protocol (IP) phone, comprising:
a normal audio output module for generating a normal verbal audio signal received from a phone endpoint;
a maintenance module for controlling the settings, and for generating a configuration audio signal internally from inside the IP phone verbally identifying an IP address configured within the IP phone;
a speaker;
driving means for driving the speaker in response to a supplied audio signal; and
switching means for supplying to the driving mean the normal audio signal during a normal operating mode and supplying the driving means the configuration audio signal during a configuration mode.

22. A system for configuring an Internet Protocol (IP) appliance, comprising:
means for powering up the IP appliance;
means for automatically operating the IP appliance in a configuration mode after the IP appliance is powered up, the IP appliance in the configuration mode providing a verbal prompt directly from within the IP appliance audibly querying a user to identify, set or adjust the configuration parameter for the IP appliance;
means for receiving a request to identify, set or adjust the configuration parameter responsive to the verbal prompt;
means for identifying, setting or adjusting the configuration parameter according to the received request;
means for generating an electrical signal corresponding to the identity, setting or adjustment of the configuration parameter;
means for applying the electrical signal to a speaker of the appliance to audibly identify or verify the identity, setting or adjustment of the configuration parameter; and
means for automatically switching the IP appliance from the configuration mode to a normal audio output mode where music from an internal music source or human recognizable voice signals received from a user at an opposite telephone endpoint are output from the speaker when the received request indicates no additional identifying, setting or adjustment of the configuration parameter is required.

23. A system according to claim 22, further comprising:

means for decoding a first configuration command;

means for generating a first electrical signal responsive to the first configuration command;

means for applying the first electrical signal to the speaker of the IP appliance to generate a first sound signal;

means for waiting to receive an input for a preset period of time after applying the first electrical signal to the speaker;

means for generating a second electrical signal when no input has been received after the preset period of time; and means for applying the and electrical signal to the speaker.

24. A system according to claim 22, further comprising:

means for receiving Dual Tone Multi-Frequency (DTMF) signals from a phone keypad containing the request responsive to the verbal prompt; and means for identifying, setting or adjusting the configuration parameter according to the DTMF signals.

25. A system according to claim 22, further comprising:

means for operating the appliance in a normal operating mode for generating normal audio signals;

means for operating the appliance in a configuration mode for configuring the appliance;

means for generating configuration signals during the configuration mode corresponding to the configuration parameter; and means for controlling switching to the speaker for supplying the speaker with the normal audio signals during the normal operating mode and supplying the speaker with the configuration signals during the configuration mode.

26. A system according to claim 22, further comprising means for using the configuration parameter to identify, set, or adjust an IP address configured in a Voice Over IP (VoIP) phone or IP radio.

27. A computer readable medium for configuring an Internet Protocol (IP) appliance without an interface that displays a configuration parameter, the computer readable medium comprising;

powering up the IP appliance:

automatically operating the IP Appliance in a configuration mode after the IP appliance is powered up, the IP appliance in the configuration mode providing a verbal prompt directly from within the IP appliance audibly querying a user to identify, set or adjust the configuration parameter for the IP appliance;

receiving a request to identify, set or adjust the configuration parameter responsive to the verbal prompt;

identifying, setting or adjusting the configuration parameter according to the received request;

generating an electrical signal corresponding to the identity, setting or adjustment of the configuration parameter;

applying the electrical signal to a speaker of the appliance to audibly identify or verify the identity, setting or adjustment of the configuration parameter; and automatically switching the IP appliance from the configuration mode to a normal audio output mode where music from an internal music source or human recognizable voice signals received from a user at an opposite telephone endpoint are output from the speaker when the received request indicates no additional identifying, setting or adjustment of the configuration parameter is required.

28. A computer readable medium according to claim 27, the computer readable medium further comprising:

decoding a first configuration command;

generating a first electrical signal responsive to the first configuration command;

applying the first electrical signal to the speaker of the IP appliance to generate a first sound signal;

waiting to receive an input for a preset period of time after applying the first electrical signal to the speaker;

generating a second electrical signal when no input has been received after the preset period of time; and applying the second electrical signal to the speaker.

29. A computer readable medium according to claim 27, the computer readable medium further comprising:

receiving Dual Tone Multi-Frequency (DTMF) signals from a phone keypad containing the request responsive to the verbal prompt; and identifying, setting or adjusting the configuration parameter according to the DTMF signals.

30. A computer readable medium according to claim 27, the computer readable medium further comprising:

operating the appliance in a normal operating mode for generating normal audio signals;

operating the appliance in a configuration mode for configuring the appliance;

generating configuration signals during the configuration mode corresponding to the configuration parameter; and controlling switching to the speaker for supplying the speaker with the normal audio signals during the normal operating mode and supplying the speaker with the configuration signals during the configuration mode.

31. A computer readable medium according to claim 27, the computer readable medium further comprising using the configuration parameter to identify, set, or adjust an IP address configured in a Voice Over IP (VoIP) phone or IP radio.

* * * * *

UNITED STATES PATENT AND TRADEMARK OFFICE
CERTIFICATE OF CORRECTION

PATENT NO.        : 6,775,697 B1
APPLICATION NO. : 09/579722
DATED              : August 10, 2004
INVENTOR(S)      : Surazski et al.

It is certified that error appears in the above-identified patent and that said Letters Patent is hereby corrected as shown below:

At column 7, line 58, please replace "appliance in configuration mode" with --appliance in a configuration mode--

At column 8, line 29, please replace "the present period" with --the preset period--

At column 8, line 34, please replace "protocol (TP) network" with --protocol (IP) network--

At column 8, line 46, please replace "module a further" with --module further--

At column 8, line 56, please replace "generates present verbal" with --generates preset verbal--

At column 9, line 15, please replace "the IP application" with --the IP appliance--

At column 9, line 61, please replace "operating in mode" with --operating mode--

At column 10, line 36, please replace "the driving mean" with --the driving means--

At column 11, line 17, please replace "the and electrical signal" with --the second electrical signal--

At column 11, line 45, please replace "comprising;" with --comprising:--

At column 11, line 46, please replace "appliance:" with --appliance;--

UNITED STATES PATENT AND TRADEMARK OFFICE
CERTIFICATE OF CORRECTION

PATENT NO. : 6,775,697 B1
APPLICATION NO. : 09/579722
DATED : August 10, 2004
INVENTOR(S) : Surazski et al.

It is certified that error appears in the above-identified patent and that said Letters Patent is hereby corrected as shown below:

At column 11, line 47, please replace "the IP Appliance" with --the IP appliance--

Signed and Sealed this

Third Day of October, 2006

JON W. DUDAS
*Director of the United States Patent and Trademark Office*